No. 841,454. PATENTED JAN. 15, 1907.
C. E. SARGENT.
PRESSURE GAGE.
APPLICATION FILED NOV. 3, 1904.
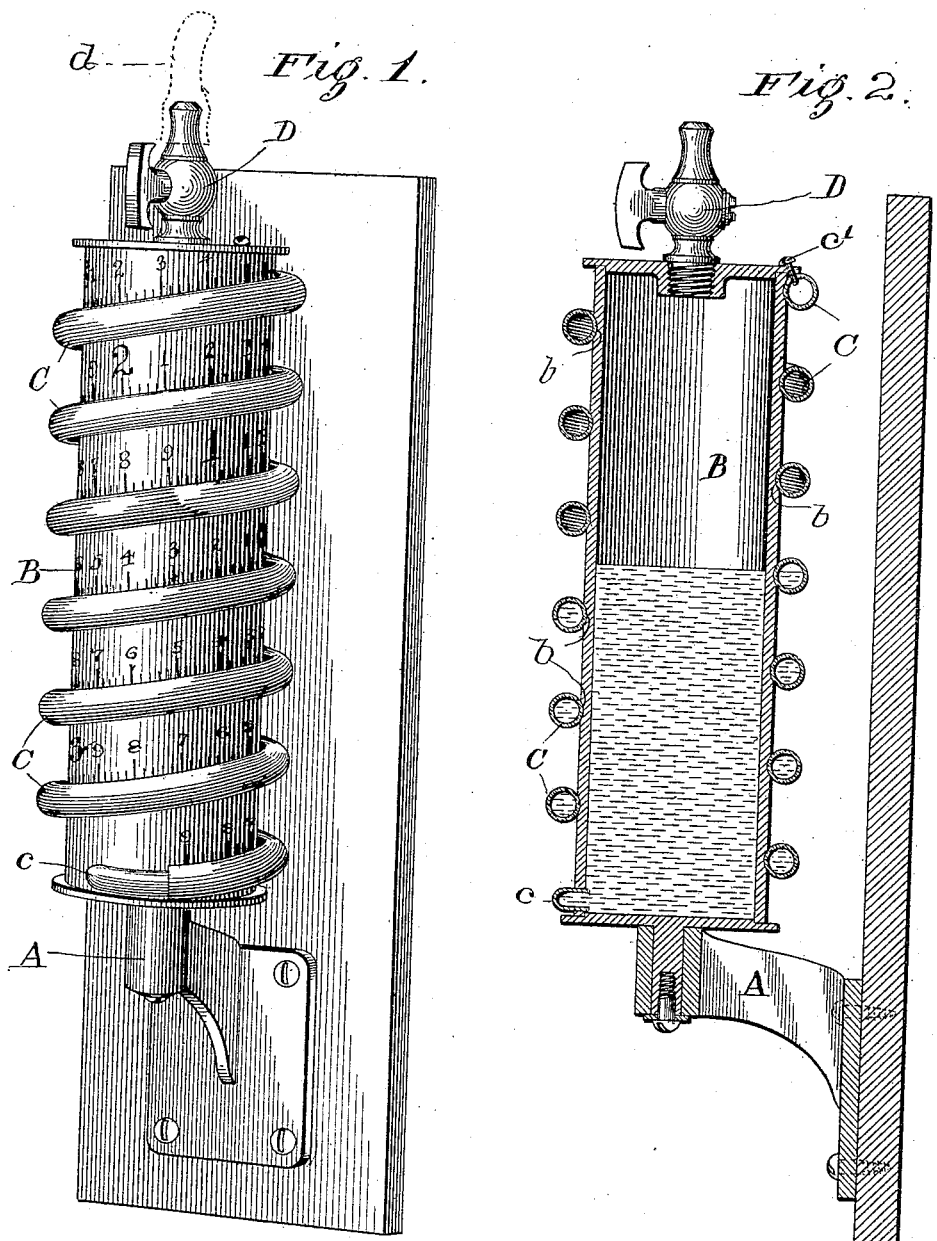
Witnesses:
K. M. Cornwall
J. E. Sherrey
Inventor:
Charles E. Sargent,
by Bitner, Miles & Sherrey
Attys.

UNITED STATES PATENT OFFICE.

CHARLES E. SARGENT, OF CHICAGO, ILLINOIS.

PRESSURE-GAGE.

No. 841,454.  Specification of Letters Patent.  Patented Jan. 15, 1907.

Application filed November 3, 1904. Serial No. 231,192.

*To all whom it may concern:*

Be it known that I, CHARLES E. SARGENT, a citizen of the United States of America, residing at Chicago, in the county of Cook and State of Illinois, have invented certain new and useful Improvements in Pressure-Gages, of which the following is a specification.

My invention relates to certain new and useful improvements in pressure-gages; and its object is to produce a device of this class which shall have certain advantages, which will appear more fully and at large in the course of this specification.

To this end my invention consists in certain novel features, which are shown in the accompanying drawings as embodied in my preferred form of construction.

In the aforesaid drawings, Figure 1 is a perspective view of my improved pressure-gage, and Fig. 2 is a central vertical section through the same.

Referring to the drawings, A is a bracket at the end of which is journaled a vertical cylinder B. About the cylinder B is wrapped a spiral tube C, of some transparent or translucent material, preferably celluloid or the like. The tube C is connected at its lower end by a short metal tube $c$ with the interior of the cylinder B and at its upper end is open to the air. The tube C is held in place by a screw $c'$. At the upper end of the cylinder is a cock D, shaped to receive the end of a rubber or other flexible tube, (shown in dotted lines at $d$ of Fig. 1.) Except for the cock D and the opening into the tube the cylinder B is entirely closed.

The outer face of the cylinder B is marked in scale-divisions, the scale running along above the turns of the tube C. The scale is laid out by calibration, as will hereinafter be explained. The zero of the scale, it will be seen, lies approximately at the middle of the cylinder and the divisions are numbered in both directions therefrom.

My improved pressure-gage is adapted for measuring very light pressures or very slight vacua, and it is particularly designed for a draft-gage to measure the pressure in a chimney.

In operation water or other liquid, which may be colored or not, as is desired, is poured into the cylinder until it rises in the spiral tube to zero of the scale. The tube lies at such an angle that water or similar liquid forms a practically vertical meniscus at the upper side of the tube, which affords a very satisfactory indicating-point. When no pressure exists, this meniscus should lie opposite the zero of the scale. The top of the gage is then connected by a tube with the body of vapor whose pressure it is desired to measure and the cock is opened. The increase or decrease of pressure on the water in the cylinder will cause the water to rise or fall in the spiral tube, and the amount of pressure or vacuum can be read in inches of water and fractions thereof on the scale. The scale is laid off in the first instance by applying known pressures to the liquid in the cylinder and laying off the scale therefrom.

It will be obvious that the length of the scale-divisions will depend on the relative sizes of the cylinder and tube, for the ultimate indication depends not upon the absolute rise in the tube, but upon the level in the tube as compared with the level in the cylinder. Of course after a single scale has been laid off any number of devices of the same size can be made by copying the scale on the first device.

My draft-gage is particularly desirable in that it is very compact and easy to read, and in addition the length of tube used to indicate a short rise or fall of the liquid is so great as to make extremely accurate reading possible. The inclination of the tube and the surface tension of the water give a vertical meniscus which assists in the accuracy of the readings. The cylinder is made rotatable, so that all sides of it are readily accessible, and this is the most convenient arrangement, for the device when so constructed can be mounted upon a wall. In any case the rotatable mounting is probably more desirable, although it will be obvious that an operative and perhaps a commercially successful device can be made without this feature.

It should be noticed that the cylinder B is provided with a spiral groove $b$ extending around it and adapted to form a seat for the spiral tube C. This arrangement insures the proper positioning of the tube and avoids any chance of its becoming displaced.

I realize that considerable variation is possible in the details of this construction without departing from the spirit of the invention, and I therefore do not intend to limit myself to the specific form herein shown and described.

I claim as new and desire to secure by Letters Patent—

The combination with a bracket, a cylindrical reservoir rotatably secured thereto, said reservoir having an opening at its upper end adapted to be put in communication with the vapor whose pressure is to be measured and a body of liquid within the reservoir, of a tube wound spirally about the reservoir, said tube opening at its lower end at the bottom of the reservoir and having its upper end open to the air.

In witness whereof I have signed the above application for Letters Patent, at Chicago, in the county of Cook and State of Illinois, this 22d day of October, A. D. 1904.

CHARLES E. SARGENT.

Witnesses:
    CHAS. O. SHERVEY,
    K. M. CORNWALL.